United States Patent
Tanaka (10) Patent No.: US 7,975,145 B2
(45) Date of Patent: Jul. 5, 2011

(54) APPARATUS AND PROGRAM FOR UPDATE OF TIME STAMP

(75) Inventor: Tomonari Tanaka, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1034 days.

(21) Appl. No.: 11/586,546

(22) Filed: Oct. 26, 2006

(65) Prior Publication Data

US 2007/0106912 A1    May 10, 2007

(30) Foreign Application Priority Data

Nov. 4, 2005  (JP) ................ P2005-321526

(51) Int. Cl.
*H04L 9/00* (2006.01)
(52) U.S. Cl. ...................... 713/178; 713/156
(58) Field of Classification Search .......... 713/156, 713/178; 714/6
See application file for complete search history.

(56) References Cited

U.S. PATENT DOCUMENTS

| | | | | |
|---|---|---|---|---|
| 6,081,507 | A * | 6/2000 | Chao et al. ............ | 370/235 |
| 6,367,013 | B1 * | 4/2002 | Bisbee et al. ............ | 713/178 |
| 6,480,970 | B1 * | 11/2002 | DeKoning et al. ............ | 714/6 |
| 6,601,172 | B1 * | 7/2003 | Epstein ............ | 713/178 |
| 6,931,537 | B1 * | 8/2005 | Takura et al. ............ | 713/178 |
| 7,340,610 | B1 * | 3/2008 | Yagawa ............ | 713/178 |
| 2003/0159048 | A1 * | 8/2003 | Matsumoto et al. ............ | 713/178 |
| 2006/0200661 | A1 * | 9/2006 | Doonan et al. ............ | 713/156 |
| 2008/0307247 | A1 * | 12/2008 | Uehata ............ | 713/500 |

FOREIGN PATENT DOCUMENTS

| | | |
|---|---|---|
| JP | 2002-006739 | 1/2002 |
| JP | 2003-263518 | 9/2003 |
| JP | 2005-063268 | 3/2005 |
| JP | 2005-130488 | 5/2005 |
| JP | 2006-63268 | 3/2006 |

OTHER PUBLICATIONS

"Guideline of Time Stamp for Long-Run Certification", Feb. 2005, Time Business Forum (TBF), "URL:http://www.scat.or.jp/time/PDF/choukihosyouguidelineVer1.1.pdf" searched on Jul. 15, 2005).
Notice of Reasons for Rejection for Application No. 2005-321526, Japanese Patent Office, mailed Oct. 6, 2009.

* cited by examiner

*Primary Examiner* — Vivek Srivastava
*Assistant Examiner* — Michael Anderson
(74) *Attorney, Agent, or Firm* — Finnegan, Henderson, Farabow, Garrett & Dunner, L.L.P.

(57) ABSTRACT

A time stamp updating apparatus includes: a time stamp obtaining unit configured to transmit hash value calculated from certification target data to an apparatus for time stamp authority when certification target data is input, to receive time stamp data from the apparatus for time stamp authority, to relate the received time stamp data to certification target data, and stored them in an evidence data storage unit; and a time stamp verification unit configured to calculate logical OR of a validity period of the time stamp data related to certification target data, and to output a period that can go back from time of verification as a period when the certification target data can be certified.

12 Claims, 10 Drawing Sheets

| NAME OF TIME STAMP DATA | SEAL TARGET DATA | TIME | HASH VALUE OF SEAL TARGET DATA | STORAGE LOCATION |
|---|---|---|---|---|
| S-1.tsp | ORIGINAL.txt | 17:48 DEC 28, 2004 | 8a35f0be1243d957 | /home/tsp/ |
| S-2.tsp | S-1.tsp | 14:52 FEB 12, 2005 | 9cd251ba74938025 | /home/tsp/ |
| S-3.tsp | S-2.tsp | 17:48 MAR 24, 2005 | 63ef024aa32229d | /home/tsp/ |
| S-4.tsp | S-3.tsp | 16:49 MAY 20, 2005 | 1a9047bc83452de5 | /home/tsp/ |

FIG. 5

| NAME OF TIME STAMP DATA | START TIME OF VALIDITY PERIOD | END TIME OF VALIDITY PERIOD |
|---|---|---|
| S-1.tsp | 17:48 DEC 28, 2004 | 23:15 APR 10, 2005 |
| S-2.tsp | 14:52 FEB 12, 2005 | 23:10 JUN 1, 2005 |
| ... | ... | ... |

| NAME OF ORIGINAL TIME STAMP DATA | SEAL TARGET DATA | GENERATION | TIME | HASH VALUE OF SEAL TARGET DATA | STORAGE LOCATION |
|---|---|---|---|---|---|
| S-1.tsp | ORIGINAL1.txt | N-1 | 17:48 DEC 28, 2004 | 8a35f0be1243d957 | /home/tsp/ |
| S-2.tsp | ORIGINAL2.txt | N-1 | 14:52 FEB 12, 2005 | 9cd251ba74938025 | /home/tsp/ |
| S-3.tsp | ORIGINAL3.txt | N | 13:03 MAR 24, 2005 | 63ef024aa32229d | /home/tsp/ |
| S-4.tsp | ORIGINAL4.txt | N | 15:29 MAY 2, 2005 | 57fab19d0ae39210 | /home/tsp/ |
| S-5.tsp | ORIGINAL5.txt | N+1 | 18:49 MAY 20, 2005 | 1a9047bc83452de5 | /home/tsp/ |

| NAME OF OVERWRITING TIME STAMP DATA | GENERATION | TIME | HASH VALUE OF SEAL TARGET DATA | STORAGE LOCATION |
|---|---|---|---|---|
| SU(N-2).tsp | N-2 | 17:48 DEC 28, 2004 | 8a35f0be1243d957 | /home/tsp/ |
| SU(N-1).tsp | N-1 | 14:52 FEB 12, 2005 | 9cd251ba74938025 | /home/tsp/ |
| SU(N).tsp | N | 13:03 MAR 24, 2005 | 63efb024aa32229d | /home/tsp/ |
| SU(N+1).tsp | N+1 | 15:29 MAY 2, 2005 | 57fab19d0ae39210 | /home/tsp/ |
| SU(N+2).tsp | N+2 | 18:49 MAY 20, 2005 | 1a9047bc83452de5 | /home/tsp/ |

FIG. 13

APPARATUS AND PROGRAM FOR UPDATE OF TIME STAMP

CROSS REFERENCE TO RELATED APPLICATIONS

This application is based upon and claims the benefit of priority from the prior Japanese Patent Applications P2005-321526 filed on Nov. 4, 2005; the entire contents of which are incorporated herein by reference.

BACKGROUND OF THE INVENTION

1. Field of the Invention

The present invention pertains to an apparatus and a program for update of a time stamp to be able to certify certification target data on the basis of time stamp data transmitted from an apparatus for time stamp authority.

2. Description of the Related Art

A request for forensic technology has increased as development of an information processing apparatus in recent year. The forensic declares a series of a scientific search method and technology which performs preservation of evidence and research/analysis of an electromagnetic record, and performs analysis/data gathering, etc. such as the falsification and damage of the electromagnetic record, to an incident response and legal dispute/lawsuits. Here, the incident response declares response to unauthorized use of resources and environments on a computer and a network, etc., service sabotage, destruction of data, disclosure of information not intended etc., and action (incident) etc. to arrive at them etc. According to such the forensic technology, computer security can be maintained to positive by secure of the digital evidence being attempted.

As one of the technologies of this forensic, a digital signature and a time stamp are proposed. According to the digital signature, an author and contents of electronic data are able to specify. On the other hand, according to the time stamp, the existence time of the electronic data is able to certify. More specifically, the time stamp has improved probative force of the electronic data by each certificate function of existence certification and integrity certification. The existence certification certifies when the electronic data exists until. The integrity certification certifies whether or not the contents of the electronic data are falsified.

The time stamp is certified by a certificate issued by an apparatus for time stamp authority of Time Stamp Authority (TSA) with the authority of RFC3161 and ISO18014. For example, when hash value obtained from the electronic data to be certified by a hash function is transmitted to the apparatus for time stamp authority, generates information on the time certificate etc. in the apparatus for time stamp authority on the basis of the received hash value and it replies. When verifying, the hash value is calculated on the basis of the verification target data, and the calculated hash value and the hash value included in the time certificate are compared. As a result, if both are matched, it is certified that the verification target data exists at the time and is not falsified.

In general, there is a method of automatically performing an extension operation of the validity period of the digital signature (for example, Japanese patent Laid Open Publication (Kokai) No. 2002-6739). According to this method, the throughput of the re-signature of the digital signature can be reduced.

Moreover, as a method of certificating the time stamp during the long-run, a method that certifies by valid time stamp for a long term and a method that certifies for a long term by extending the validity period for a short term repeatedly of the valid time stamp etc. are disclosed (for example, "GUIDELINE OF TIME STAMP FOR LONG-RUN CERTIFICATION", February 2005, Time Business Forum (TBF), "URL: http://www.scat.or.jp/time/PDF/choukihosyouguidelin eVer1.1.pdf" searched on Jul. 15, 2005).

However, according to the method of the latter mentioned above, there is a problem that the certification at the time certified by the time stamp becomes impossible when one time stamp is invalid. At this time, even if the certification target data is not falsified, there is a possibility that the existence certification at the predetermined time becomes impossible by incompletely and leaking of the time stamp.

Then, the method of surely enabling the existence certification of the certification target data for a long period has been expected.

SUMMARY OF THE INVENTION

Therefore, the present invention aims certificating with an apparatus and a program for update of the time stamp that is able to certify of the certification target data for a long period.

To solve the above-mentioned problem, the first character of this invention relates an apparatus for update of a time stamp, the apparatus being able to certify certification target data on the basis of time stamp data transmitted from an apparatus for time stamp authority. The apparatus for update of a time stamp according to the first character comprising: an evidence data storage unit configured to relate the certification target data to the time stamp data and to save the related certification target data and time stamp data; a time stamp obtaining unit configured to transmit hash value calculated from seal target data including the time stamp data that has already been related to the certification target data to the apparatus for time stamp authority according to a certain prescribed timing, to receive time stamp data to the seal target data from the apparatus for time stamp authority, to relate the obtained time stamp data to the certification target data, and to store the related time stamp data and the certification target data in the evidence data storage unit; and a time stamp verification unit configured to calculate logical OR of a validity period of the time stamp data related to the certification target data, and to output a period that can go back from time of verification as a period when the certification target data can be certified.

The second character of this invention relates A computer executable program for update of a time stamp, the computer executable program being able to certify certification target data on the basis of time stamp data transmitted from an apparatus for time stamp authority. The computer executable program according to the second character of this invention comprising: in an evidence data storage unit, relating the certification target data to the time stamp data and saving the related certification target data and time stamp data; in a time stamp obtaining unit, transmitting hash value calculated from seal target data including the time stamp data that has already been related to the certification target data to the apparatus for time stamp authority according to a certain prescribed timing, receiving time stamp data to the seal target data from the apparatus for time stamp authority, relating the obtained time stamp data to the certification target data, and storing the related time stamp data and the certification target data in the evidence data storage unit; and in a time stamp verification unit, calculating logical OR of a validity period of the time stamp data related to the certification target data, and outputting a period that can go back from time of verification as a period when the certification target data can be certified.

DETAILED DESCRIPTION

Various embodiments of the present invention will be described herein below with reference to the accompanying drawings. It is to be noted that the same or similar reference numerals are applied to the same or similar parts and elements throughout the drawings, and the description of the same or similar parts and elements will be omitted or simplified. In the embodiments of the present invention, "Certification" means that the existence certification and the integrity certification of certification target data that is the electronic data of document data and image data, etc. are executed by the time stamp data provided on the basis of the certification target data.

Figure 1:
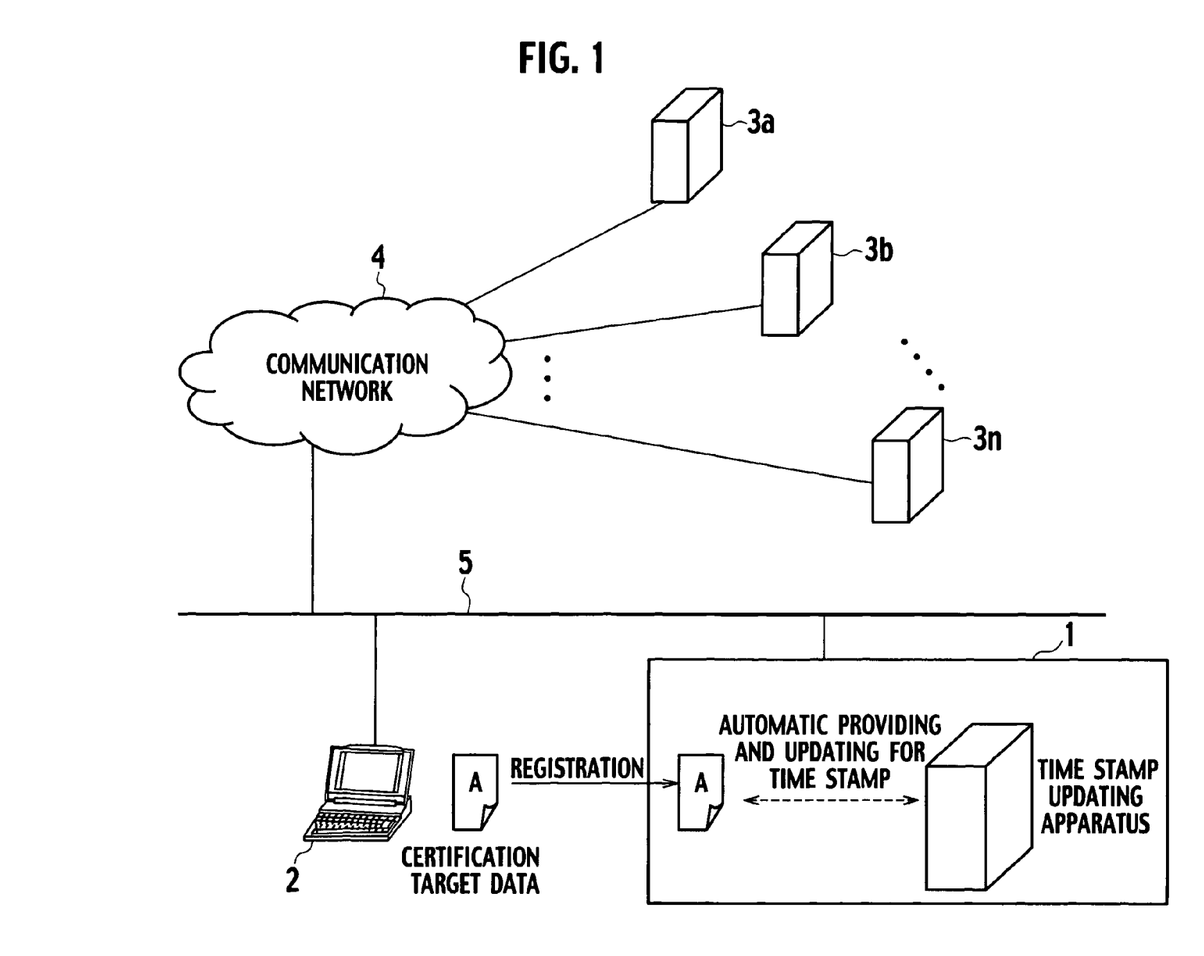
FIG. 1 is a configuration diagram showing information system including a time stamp updating apparatus according to an embodiment of the present invention.

A time stamp updating apparatus 1 according to the embodiment of the present invention is applied to information system as shown in FIG. 1. The information system shown in FIG. 1 includes the time stamp updating apparatus 1, a user terminal 2, and a first apparatus for time stamp authority 3a, a second apparatus for time stamp authority 3b, . . . , an $n^{th}$ apparatus for time stamp authority 3n. Time stamp updating apparatus 1 and user terminal 2 are connected through an internal communication network 5 such as LAN to be able to communicate mutually. The time stamp updating apparatus 1 is connected with the first apparatus for time stamp authority 3a, the second apparatus for time stamp authority 3b, . . . , the $n^{th}$ apparatus for time stamp authority 3n through the internal communication network 5 and a communication network 4 such as Internet to be able to communicate mutually.

The first apparatus for time stamp authority 3a is achieved by a predetermined program being installed in a general computer device. The first apparatus for time stamp authority 3 outputs time stamp data on the basis of a system A from inputted hash value according to requiring from the time stamp updating apparatus 1 etc. The first apparatus for time stamp authority 3a outputs public key certificate data on the basis of requiring from the time stamp updating apparatus 1 etc. The second apparatus for time stamp authority 3b, . . . , the $n^{th}$ apparatus for time stamp authority 3n are also similar to the first apparatus for time stamp authority 3a. The first apparatus for time stamp authority 3a, the second apparatus for time stamp authority 3b, . . . , the $n^{th}$ apparatus for time stamp authority 3n may provide the time stamp respectively by a unique system.

The user terminal 2 is a general computer. The User terminal 2 is a terminal which generates certification target data to obtain the certification by the time stamp data issued by the first apparatus for time stamp authority 3a, the second apparatus for time stamp authority 3b, . . . , the $n^{th}$ apparatus for time stamp authority 3n. The certification of the certification target data becomes possible by the certification target data being input from the user terminal 2 to the time stamp updating apparatus 1.

Figure 2:
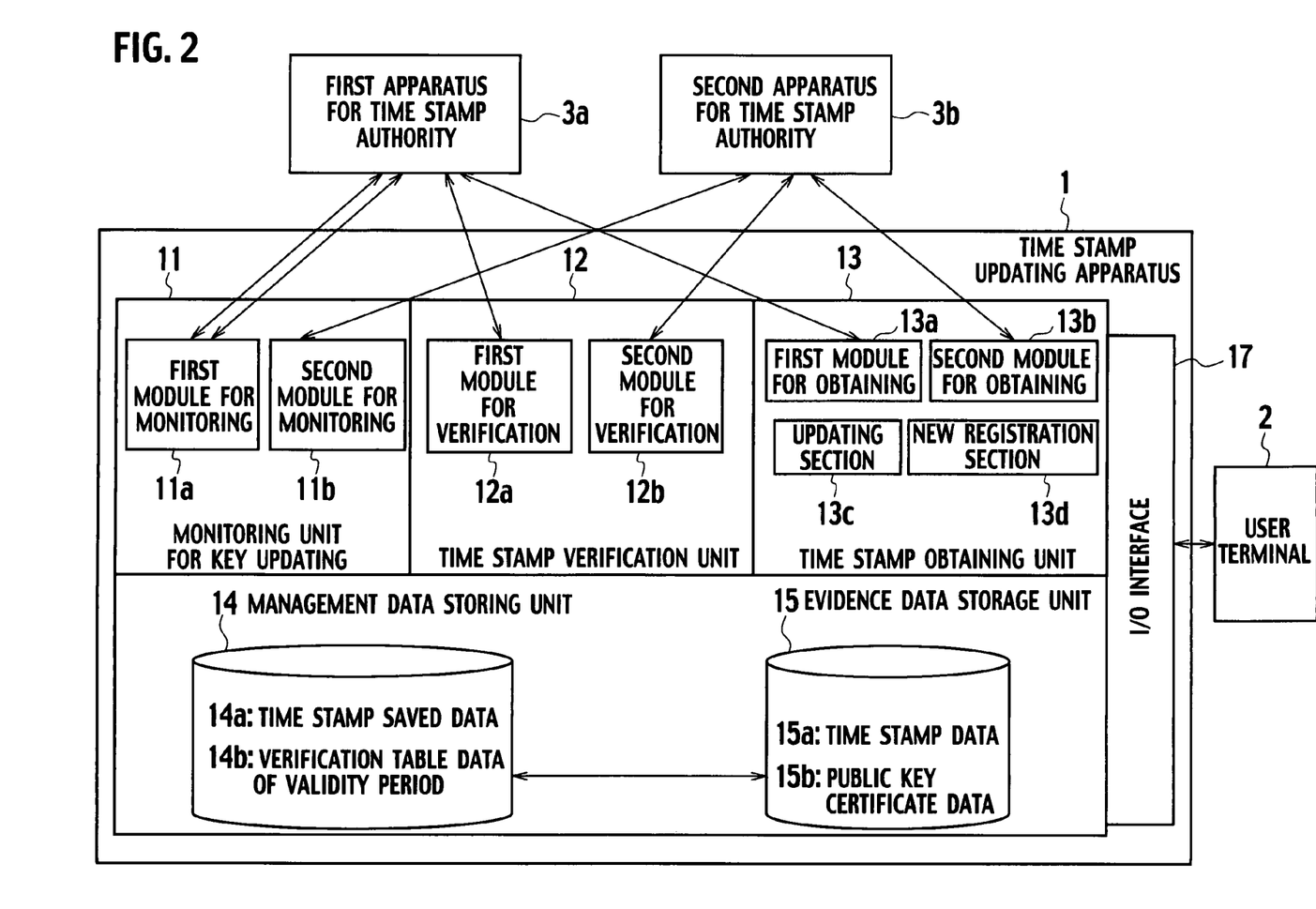
FIG. 2 is a functional block diagram showing the time stamp updating apparatus according to the embodiment of the present invention.

The time stamp updating apparatus 1 is an apparatus that enables the certification of the certification target data on the basis of the time stamp data transmitted from the apparatus for time stamp authority 3a etc. The time stamp updating apparatus 1 is achieved by a predetermined program being installed in a general computer. As shown in FIG. 2, the time stamp updating apparatus 1 includes a monitoring unit for key updating 11, a time stamp verification unit 12, a time stamp obtaining unit 13, a management data storing unit 14, an evidence data storage unit 15, and an Input/Output (I/O) interface 17.

The monitoring unit for key updating 11 detects the update of keys in the first apparatus for time stamp authority 3a, the second apparatus for time stamp authority 3b, . . . . The monitoring unit for key updating 11 includes a first module for monitoring 11a which monitors the update of the key in the first apparatus for time stamp authority 3a and a second module for monitoring 11b which monitors the update of the key in the second apparatus for time stamp authority 3b. The first module for monitoring 11a is regularly connected with the first apparatus for time stamp authority 3a. Similarly, the second module for monitoring 11b is regularly connected with the second apparatus for time stamp authority 3b. When the key used with each apparatus for time stamp authority is detected being updated, the first module for monitoring 11a and the second module for monitoring 11b notify that the key is updated to the time stamp obtaining unit 13 to be hereinafter described.

The time stamp verification unit 12 verifies verification data of the time stamp, stores a validity period of each time stamp in a verification table data of validity period 14b, calculates the logical OR of the validity period of the time stamp data related to the certification target data, and then outputs the period that can go back at time of verification as a period that can certify existence of the certification target data. The time stamp verification unit 12 includes a first module for verification 12a and a second module for verification 12b. The first module for verification 12a obtains the public key certificate and a Certificate Revocation List (CRL) (that is, the verification table data of validity period), etc. from the first apparatus for time stamp authority 3a. The second module for verification 12b obtains the public key certificate and the certificate revocation list etc. from the second apparatus for time stamp authority 3b.

The time stamp obtaining unit 13 includes an updating section 13c and a new registration section 13d.

The updating section 13c generates the seal target data including the time stamp data that has already been related to the certification target data when the key is detected being updated by the monitoring unit for key updating 11, and then transmits the hash value calculated from the generated seal target data to the first apparatus for time stamp authority 3a or the second apparatus for time stamp authority 3b where the key updating is detected. Furthermore, updating section 13c receives time stamp data 15a to the seal target data from the first apparatus for time stamp authority 3a or the second apparatus for time stamp authority 3b where the key is updated, and then stores the received time stamp data 15a in the evidence data storage unit 15.

The new registration section 13d generates the seal target data including the time stamp data that has already been provided for the certification target data when the certifying request of the certification target data is newly input from the user terminal 2, and then transmits the hash values calculated from the generated seal target data to both or either the first apparatus for time stamp authority 3a or the second apparatus for time stamp authority 3b. Furthermore, the new registration section 13d receives the time stamp data 15a to the seal target data from the first apparatus for time stamp authority 3a and the second apparatus for time stamp authority 3b, and then relates the received time stamp data 15a to the certification target data and stores it in the evidence data storage unit 15.

Moreover, the time stamp obtaining unit 13 includes a first module for obtaining 13a and a second module for obtaining 13b. After transmitting the hash value to the first apparatus for time stamp authority 3a, the first module for obtaining 13a receives the time stamp data. Similarly, after transmitting the hash value to the second apparatus for time stamp authority 3b, the second module for obtaining 13b receives the time stamp data.

Figure 3:
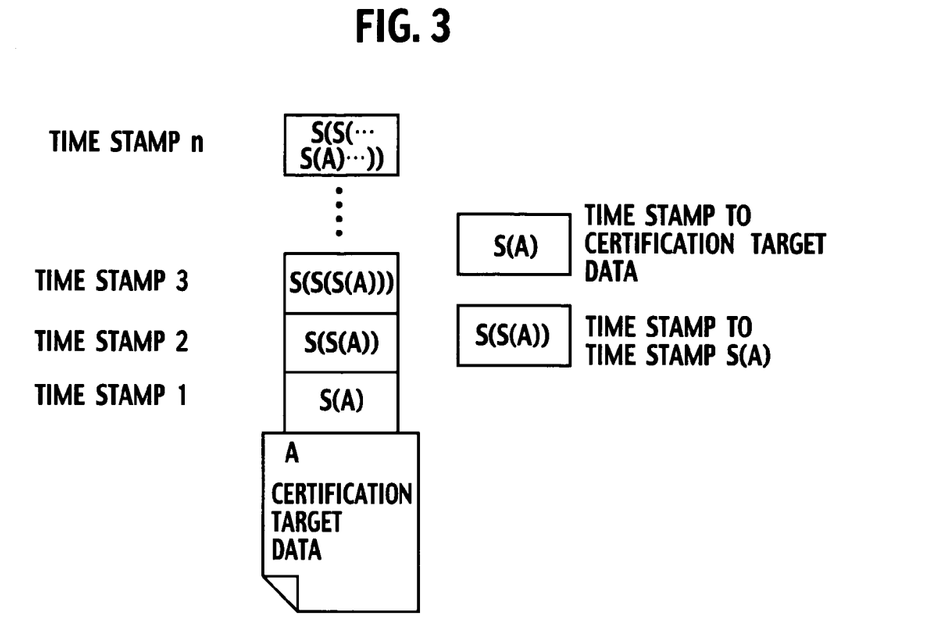
FIG. 3 is an illustration for explaining a calculation method of a hash value of the time stamp updating apparatus according to the embodiment of the present invention.

In the embodiment of the present invention, the seal target data is a time stamp data generated on the basis of the certification target data. More specifically, the seal target data is certification target data when the time stamp is provided for the certification target data for the first time, and the seal target data is the latest time stamp data related to the certification target data besides. As shown in FIG. 3, the time stamp is provided for the certification target data in the multiple. More specifically, the time stamp is repeatedly provided so as time stamp $S(A)$ based on the hash value calculated from certification target data A, time stamp $S(S(A))$ based on the hash value calculated from the time stamp $S(A)$ . . . .

The first module for monitoring 11a, the first module for verification 12a and the first module for obtaining 13a are the interface modules that receive and transmit data by the pre-determined form from/to the first apparatus for time stamp authorities 3a. Similarly, the second module for monitoring 11b, the second module for verification 12b and the second module for obtaining 13b are interface modules that receive and transmit data by the pre-determined form from/to the second apparatus for time stamp authorities 3b.

The evidence data storage unit 15 stores data obtained from the first apparatus for time stamp authority 3a and the second apparatus for time stamp authority 3b in a storage unit. The evidence data storage unit 15 includes time stamp data 15a and public key certificate data 15b. The time stamp data 15a is time stamp data obtained from the apparatus for time stamp authority by the new registration section 13d and the updating section 13c of the time stamp obtaining unit 13. The public key certificate data 15b is data of the public key certificate obtained from the apparatus for time stamp authority by the new registration section 13d and the updating section 13c of the time stamp obtaining unit 13.

The management data storing unit 14 stores data calculated by the time stamp verification unit 12 etc. in the storage unit on the basis of the data stored in the evidence data storage unit 15. The management data storing unit 14 stores time stamp saved data 14a and the validity period verification table 14b, etc. in the storage unit.

Figure 4:
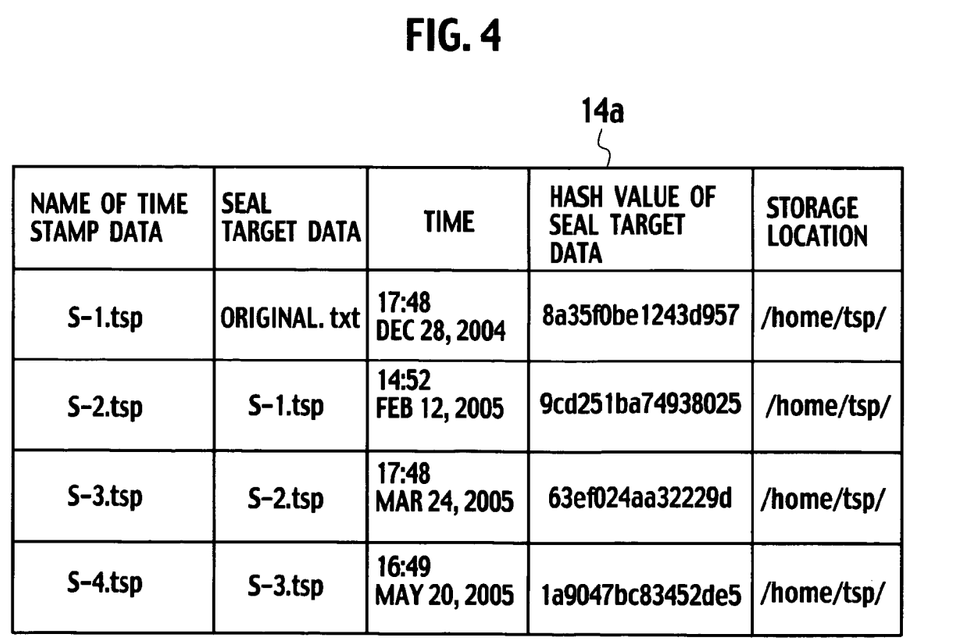
FIG. 4 is an illustration for explaining an example of data structure and an example of data of the time stamp saved data of the time stamp updating apparatus according to the embodiment of the present invention.

The time stamp saved data 14a includes a data structure and data shown in FIG. 4 as an example. More specifically, a file name of the seal target data to target the time stamp, certificating time, a hash value calculated from the seal target data and a storage location of the file of the time stamp data are related to a file name of the time stamp data 15a stored in the evidence data storage unit 15.

Figure 5:
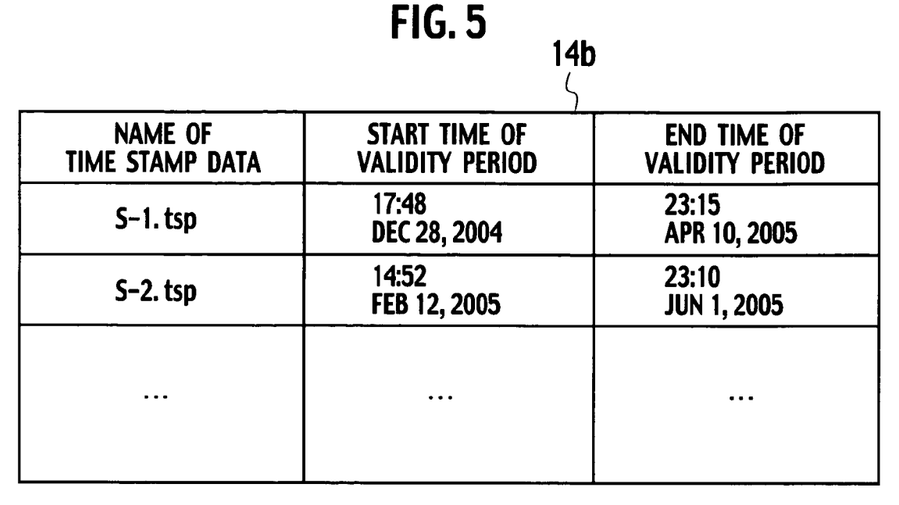
FIG. 5 is an illustration for explaining an example of data structure and an example of data of the verification table data of validity period of the time stamp updating apparatus according to the embodiment of the present invention.

The verification table data of validity period 14b is data outputted by the time stamp verification unit 12, and includes a data structure and data shown in FIG. 5 as an example. As for verification table data of validity period 14b, start time of validity period and end time of validity period are related to time stamp data names.

The I/O interface 17 is an interface of the connection with the user terminal 2. For example, when the certification target data is input from the user terminal 2, the I/O interface 17 controls the time stamp obtaining unit 13 to obtain the time stamp. Moreover, when the certificating request of the certification target data is input from the user terminal 2, the I/O interface 17 controls the time stamp verification unit 12 to verify the time stamp data of the certification target data and the public key certificate data etc., and to output the verification result.

Figure 6:
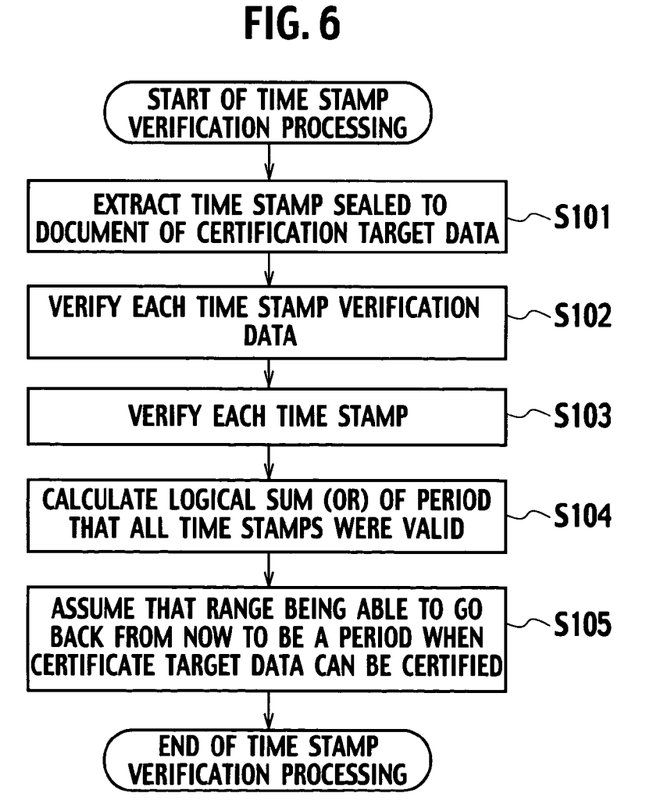
FIG. 6 is a flow chart for explaining a time stamp verification processing by a time stamp verification unit of the time stamp updating apparatus according to the embodiment of the present invention.

Next, time stamp verification processing executed by the time stamp verification unit 12 according to the embodiment of the present invention will be explained referring to FIG. 6. Hereafter, although the verification of effectiveness of the time stamp of the Public Key Infrastructure (PKI) system in the past will be explained, it is a surely that the formal validation is different according to the system of the time stamp.

First of all, in Step S101, a time stamp sealed on the basis of the certification target data is extracted from the time stamp saved data 14a. More specifically, a record where a file name of the certification target data is described in an item of "Seal target data" of the time stamp saved data 14a is extracted. Furthermore, a record whose data of "Time stamp name" of the extracted record is data of "Seal target data" is extracted. In this manner, all the time stamps, that relate to the certification target data such as the time stamp data provided for the certificating target data and the data provided for the time stamp data provided for the certification target data, are extracted.

Next, in Step S102, the time stamp extracted in Step S101 is verified.

More specifically, the public key certificate data 15b and the Certificate Revocation List (CRL) stored in the evidence data storage unit 15 are verified firstly for the PKI system. When the public key certificate expires, the existence certification before the expiration of the public key certificate is confirmed. When the existence certification before the expiration of the public key certificate data and the effectiveness at that time could be confirmed, it can be considered that the public key certificate is valid. The latest certificate revocation list is used. When the CRL of the apparatus for time stamp authority to which the time stamp is sealed or the Certificate Authority is not opened to the public, the CRL open to the public on the last time is saved. And then, when the existence certification during the period opened to the public and the effectiveness of the CRL at that time could be confirmed, it can be considered that the CRL is valid. In this manner, in Step S102, the verifying data for the time stamp data is verified, and then each the time stamp data is verified by using the valid data among them. At this time, the validity period of each time stamp data is stored in the verification table data of validity period 14b shown in FIG. 5.

Next, in Step S103, each the time stamp is verified. For example, a hash value is calculated on the basis of the certification target data, and the calculated hash value and the hash value included in the time stamp data are compared. As a result, it is certified that the certification target data exists at the time and is not falsified when the hash value of both matches with.

Figure 7:
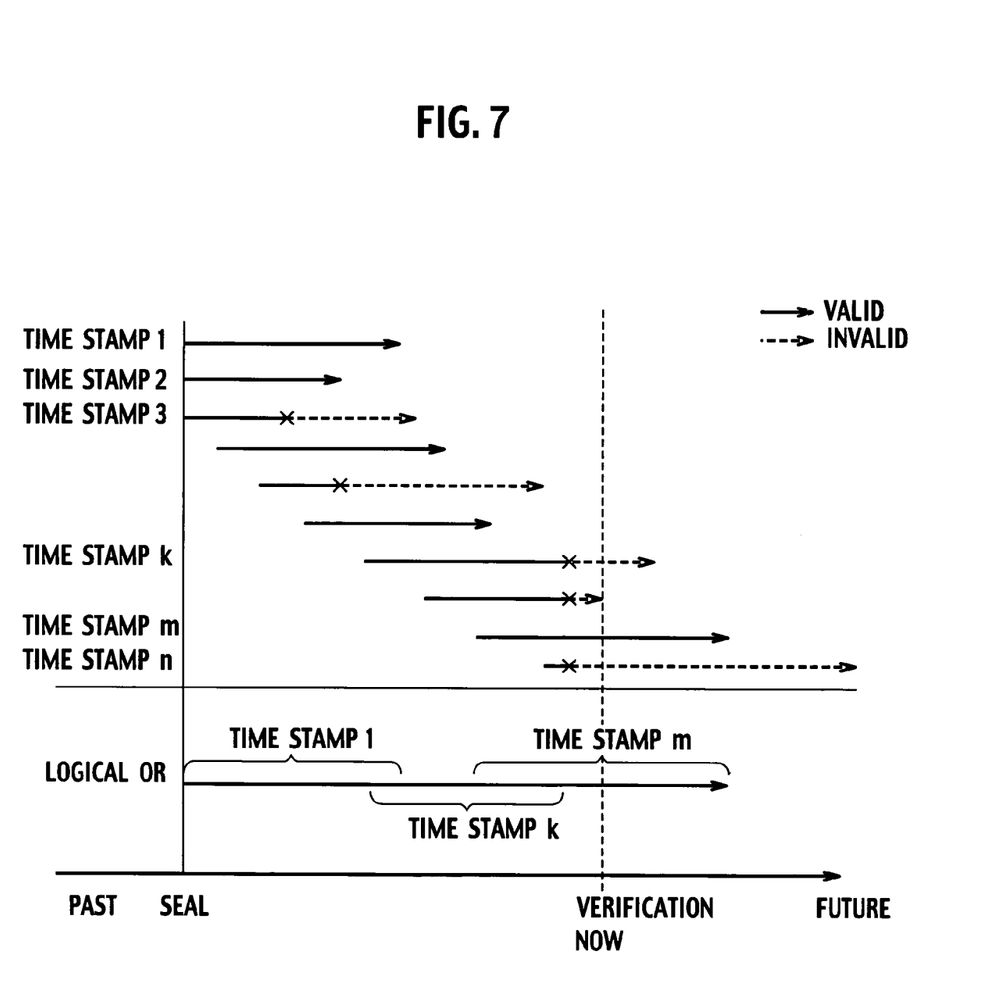
FIG. 7 is an illustration for explaining existence certification of verification target data by the time stamp verification unit of the time stamp updating apparatus according to the embodiment of the present invention.

Next, in Step S104, a logical sum (OR) during the period to which all the time stamp data had been valid is calculated on the basis of the verification table data of validity period 14b. For example, the validity period of each the time stamp data is shown like FIG. 7. In FIG. 7, each arrow shows the expiration date in point to which each time stamp data is sealed and the past effectiveness verified at the now. In addition, the period of valid is indicated by the solid line and the invalid period is indicated by the dotted line about each the validity period of the time stamp.

The range that can go back from the now in the logical OR of the validity period of each the time stamp is a period when the existence of the certification target data A is certified. When the validity period is continuous from the first time of sealing up to the now consecutively, it is certified to have existed when the first sealing. In the example of the verification shown in FIG. 7, it is shown that the validity period is consecutive at the time of sealing up to the now by using a time stamp 1, a time stamp k and a time stamp m.

Next, in Step S105, the range being able to go back from the now is assumed a period when the certification target data can be certified and is outputted. More specifically, the verification target data has been existed when the certification target data was sealed by the time stamp 1, the time stamp 2 and the time stamp 3, the certification target data is certified not to be falsified from that time.

Thus, the updating of the key is monitored in the apparatus for time stamp authority, and whenever the key is updated, the time stamp data is obtained and stored according to time stamp updating apparatus 1 according to the embodiment of the present invention. In this manner, even when the void time stamp exists on the way, the certification target data can be certified by calculating the logical sum (OR) of the validity period of two or more obtained time stamps.

FIRST MODIFICATION EXAMPLE

Figure 8:
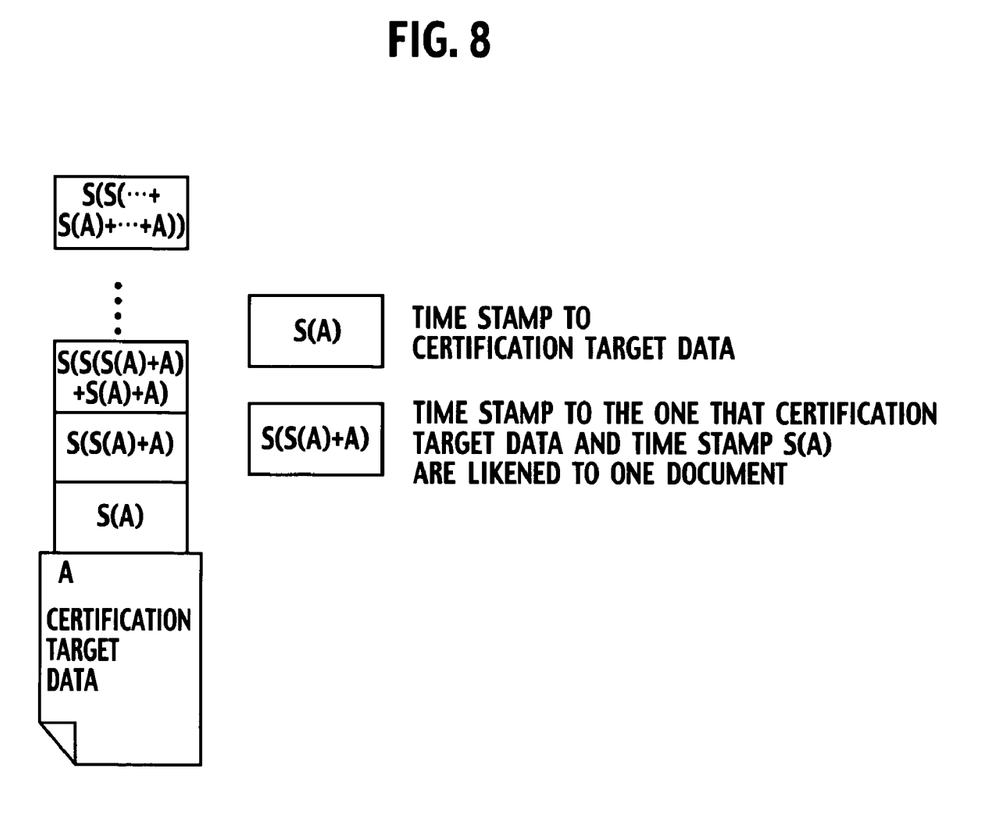
FIG. 8 is an illustration for explaining a calculation method of a hash value of a time stamp updating apparatus according to a first modification example of the embodiment of the present invention.

Next, the first modification example according to the embodiment of the present invention will be explained. In this first modification example, as shown in FIG. 8, the seal target data includes the time stamp data that has already been related to the certification target data and the certification target data.

More specifically, in the first modification example, it is repeated to seal the time stamp considering data that matches the time stamp data that has been provided and the certification target data as one document without providing a new time stamp data for only the time stamp data. Data that matches a time stamp S(A) sealed on the basis of the hash value calculated from certification target data A and the certification target data A is shown as one seal target data S(A)+A. Therefore, a time stamp S(S(A)+A) indicates the time stamp sealed on the basis of the hash value calculated from the seal target data S(A)+A.

Thus, in the first modification example, when the time stamp on the way is invalid, the certification target data can be certified by calculating the logical sum (OR) of the validity period of two or more obtained time stamps by executing the verification processing similar to the above embodiment.

SECOND MODIFICATION EXAMPLE

Next, the second modification example of the embodiment of the present invention will be explained. In this second modification example, about the case where the time stamp data includes the overwriting time stamp data and two or more original time stamp data to each generation having the predetermined period will be explained.

Figure 9:
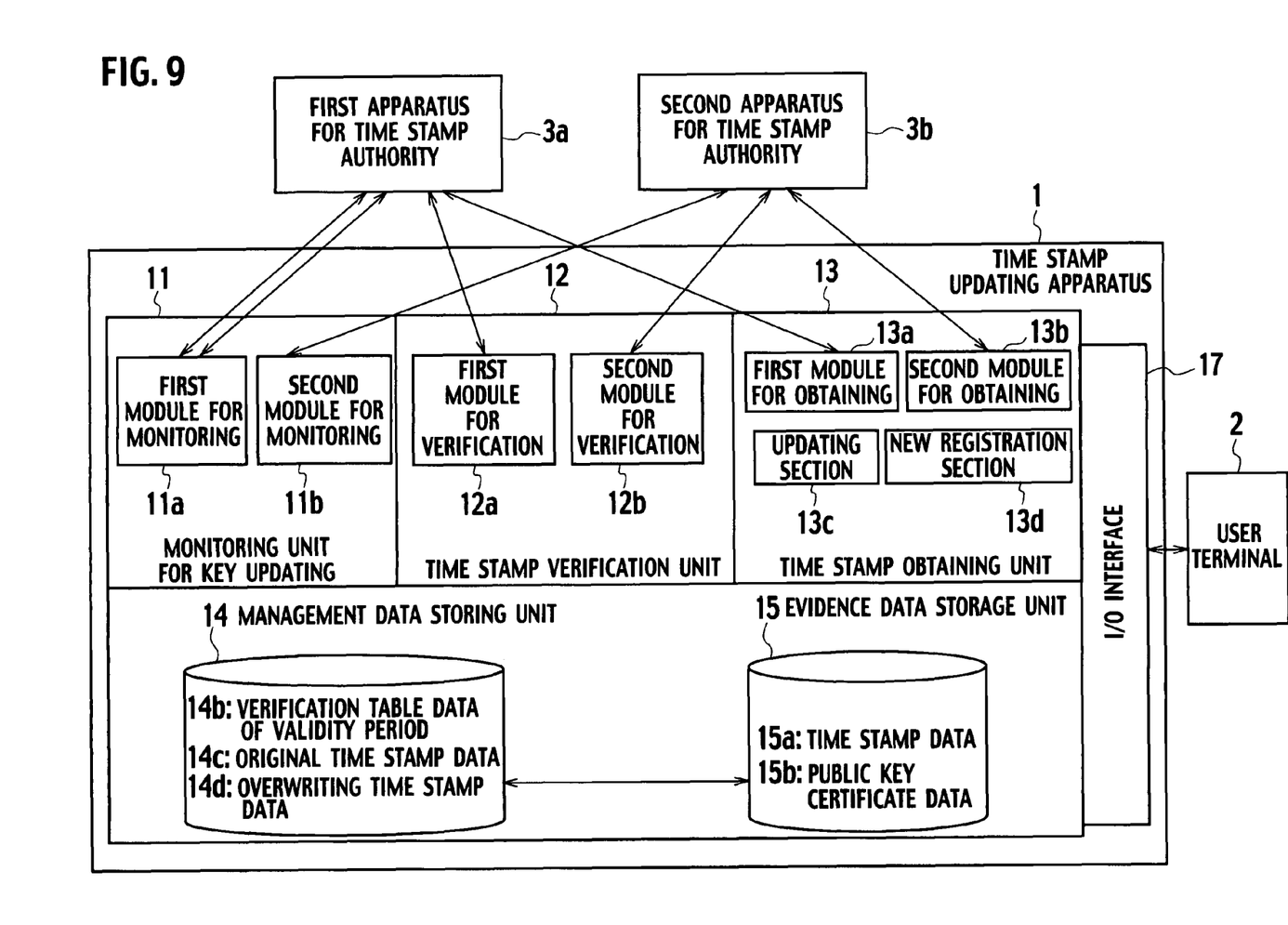
FIG. 9 is a functional block diagram showing a time stamp updating apparatus according to a second modification example of the embodiment of the present invention.

As for time stamp updating apparatus 1 according to the second modification example of the embodiment of the present invention shown in FIG. 9, the point to include an original time stamp data 14c and an overwriting time stamp data 14d instead of the time stamp saved data 14a is more different than the time stamp updating apparatus 1 according to the embodiment of the present invention shown in FIG. 2.

Figure 10:
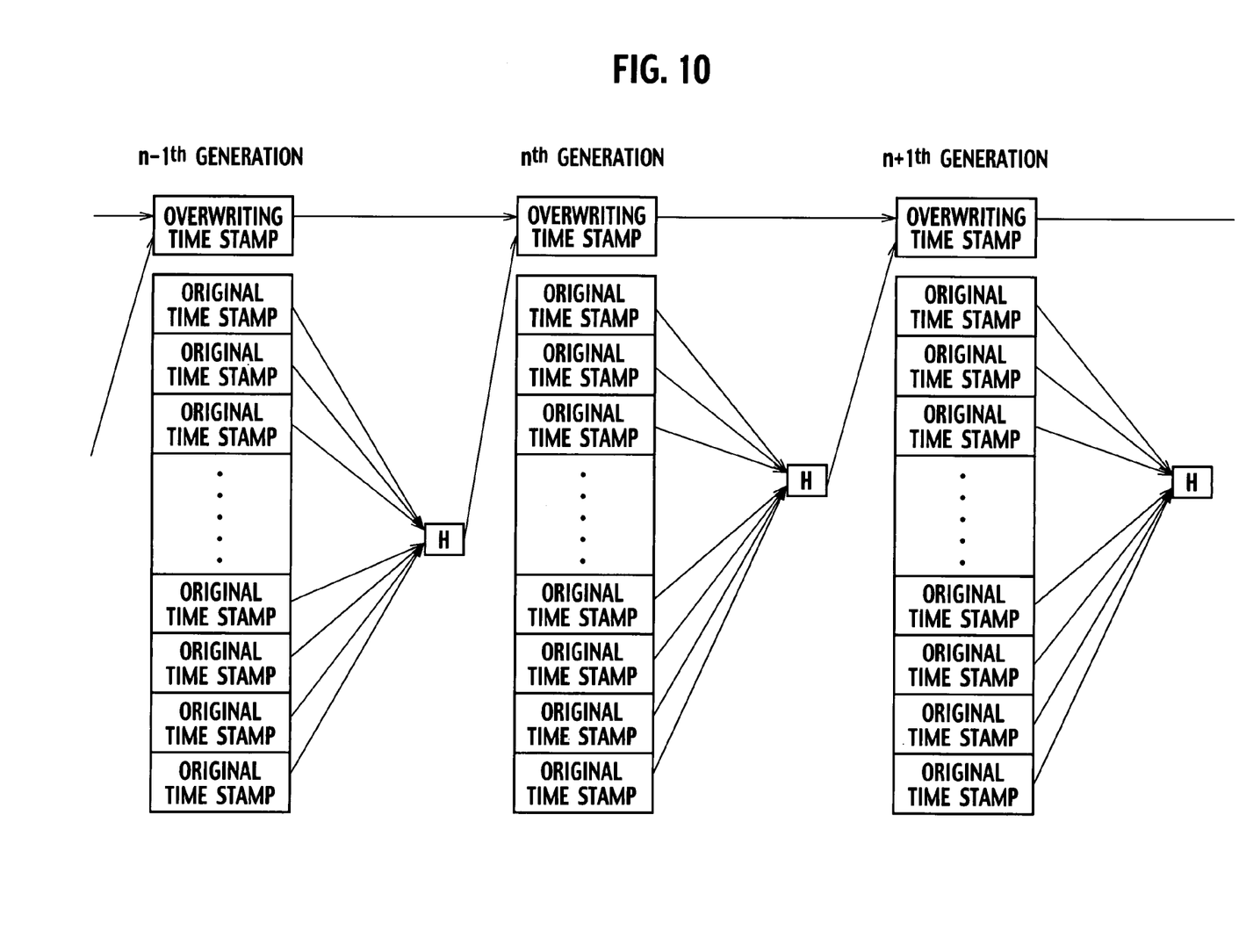
FIG. 10 is an illustration for explaining a calculation method of a hash value of the time stamp updating apparatus according to the second modification example of the embodiment of the present invention.

In the second modification example of the embodiment of the present invention, the time stamp data includes overwriting time stamp data and two or more original time stamp data to each generation as shown in FIG. 10. Here, the original time stamp data is a time stamp data provided directly for the certification target data registered as the need arises in the time stamp updating apparatus 1 according to the second modification example of the embodiment of the present invention. The overwriting time stamp data of the $n^{th}$ generation is a time stamp data to obtain all the time stamp data of the $n-1^{th}$ generation as the certification target data. More specifically, FIG. 10 shows the case where the overwriting time stamp data of the $n^{th}$ generation is generated from data that matches the hash value calculated from data that matches all the original time stamp data of the $n-1^{th}$ generation and the overwriting time stamp data of the $n-1^{th}$ generation.

Here, "Generation" is set according to the arbitrary timing in the second modification example of the embodiment of the present invention. More specifically, the arbitrary timing is timing to which the key of the apparatus for time stamp authority is updated, and is timing that a certain period passes, etc.

Figure 11:
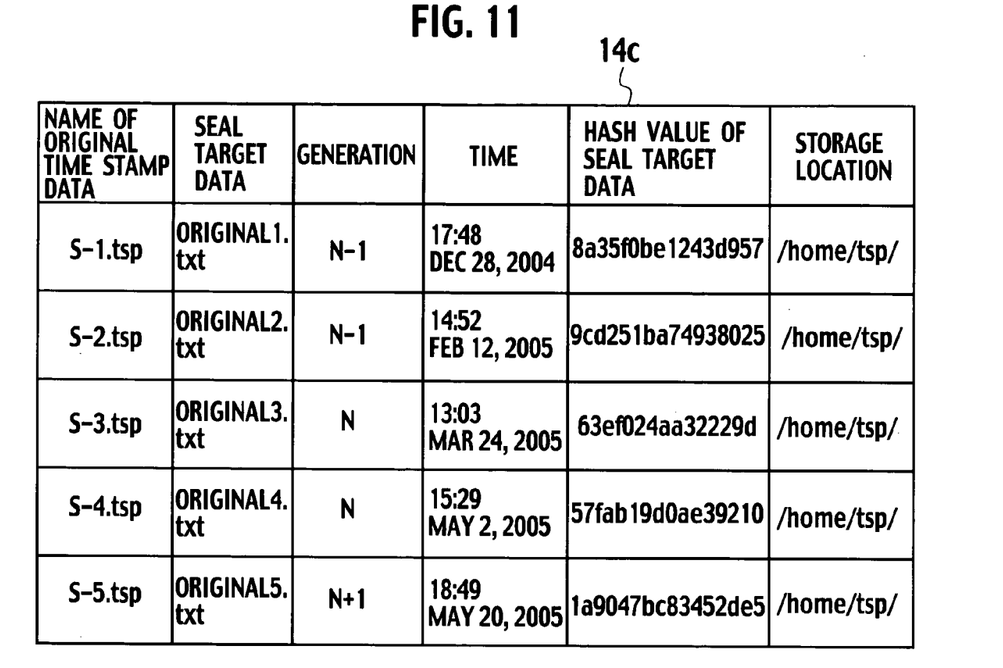
FIG. 11 is an illustration for explaining an example of data structure and an example of data of original time stamp data of the time stamp updating apparatus according to the second modification example of the embodiment of the present invention.

The time stamp updating apparatus 1 according to the second modification example of the embodiment of the present invention obtains the time stamp of the received certification target data when the certification target data is received from the user terminal 2. Furthermore, the time stamp updating apparatus 1 according to the second modification example relates the time stamp data obtained as an original time stamp data, the certification target data which is the seal target data and latest $m^{th}$ generation etc., and registers them in the original time stamp data 14c shown in FIG. 11. In the original time stamp data 14c shown in FIG. 11, the original time stamp data name, the seal target data, the generation, the time, the hash value of seal target data and the storage location are related. Registration to this original time stamp data 14c is executed every time a new certification target data is input.

Figure 12:
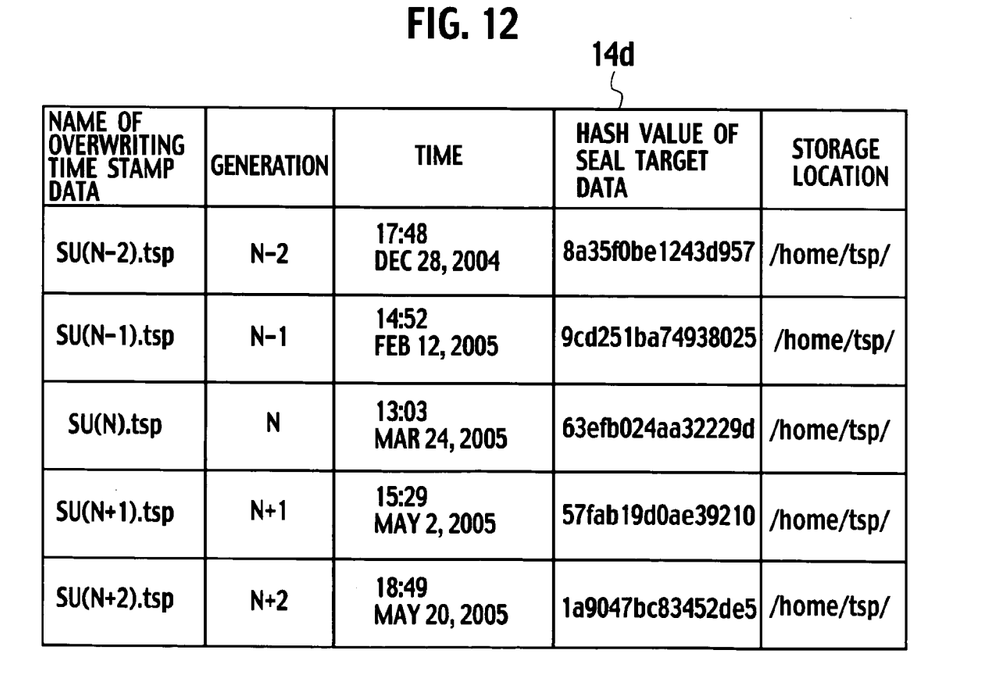
FIG. 12 is an illustration for explaining an example of data structure and an example of data of overwriting time stamp data of the time stamp updating apparatus according to the second modification example of the embodiment of the present invention.

Here, a next $m+1^{th}$ generation of the $m^{th}$ generation is generated at the arbitrary timing mentioned above. At this time, all the time stamp data of $m^{th}$ generation is assumed to be a seal target data, and one overwriting time stamp data is obtained. The obtained overwriting time stamp data is related to the $m^{th}$ generation etc., and is registered to the overwriting time stamp data 14d shown in FIG. 12. In the overwriting time stamp data 14d shown in FIG. 12, the overwriting time stamp data name, the generation, the time, the hash value of the seal target data and the storage location are related.

Afterwards, when the time stamp updating apparatus 1 receives a new certification target data from the user terminal 2, the original time stamp data obtained from a new certification target data is related to the $m+1^{th}$ generation etc. which is the latest generation, and registered in the original time stamp data 14c. The relation between the overwriting time stamp and the original time stamp is composed shown in FIG. 10 by repeating such the operation, and is stored in the original time stamp data 14c and the overwriting time stamp data 14d.

The time stamp verification unit 12 of the time stamp updating apparatus 1 according to the second modification example extracts the time stamp data 15a generated on the basis of the certification target data, and registers the validity period of the original time stamp data in the validity period verification table 14b when the verification of the original time stamp data provided for the certification target data succeeds. Furthermore, when the verification of the overwriting time stamp data of the next generation of the target generation to which the original time stamp data provided for the certification target data belongs succeeds, the time stamp verification unit 12 registers the validity period of aforementioned overwriting time stamp data in the validity period verification table 14b. Furthermore, The time stamp verification unit 12 repeats processing to increment the target generation, and registers the validity period of the overwriting time stamp data of the next generation of the incremented target generation in the validity period verification table 14b when the verification of the overwriting time stamp data of the next generation of the incremented target generation succeeds. This processing is repeated until the next generation of the target generation becomes the latest generation. When the next generation of the target generation becomes the latest generation, the time stamp verification unit 12 calculates the logical OR of the validity period of the time stamp data registered in the validity period verification table 14b, and outputs the period that can go back from the time of the verification as a period when the certification target data can be certified.

Figure 13:
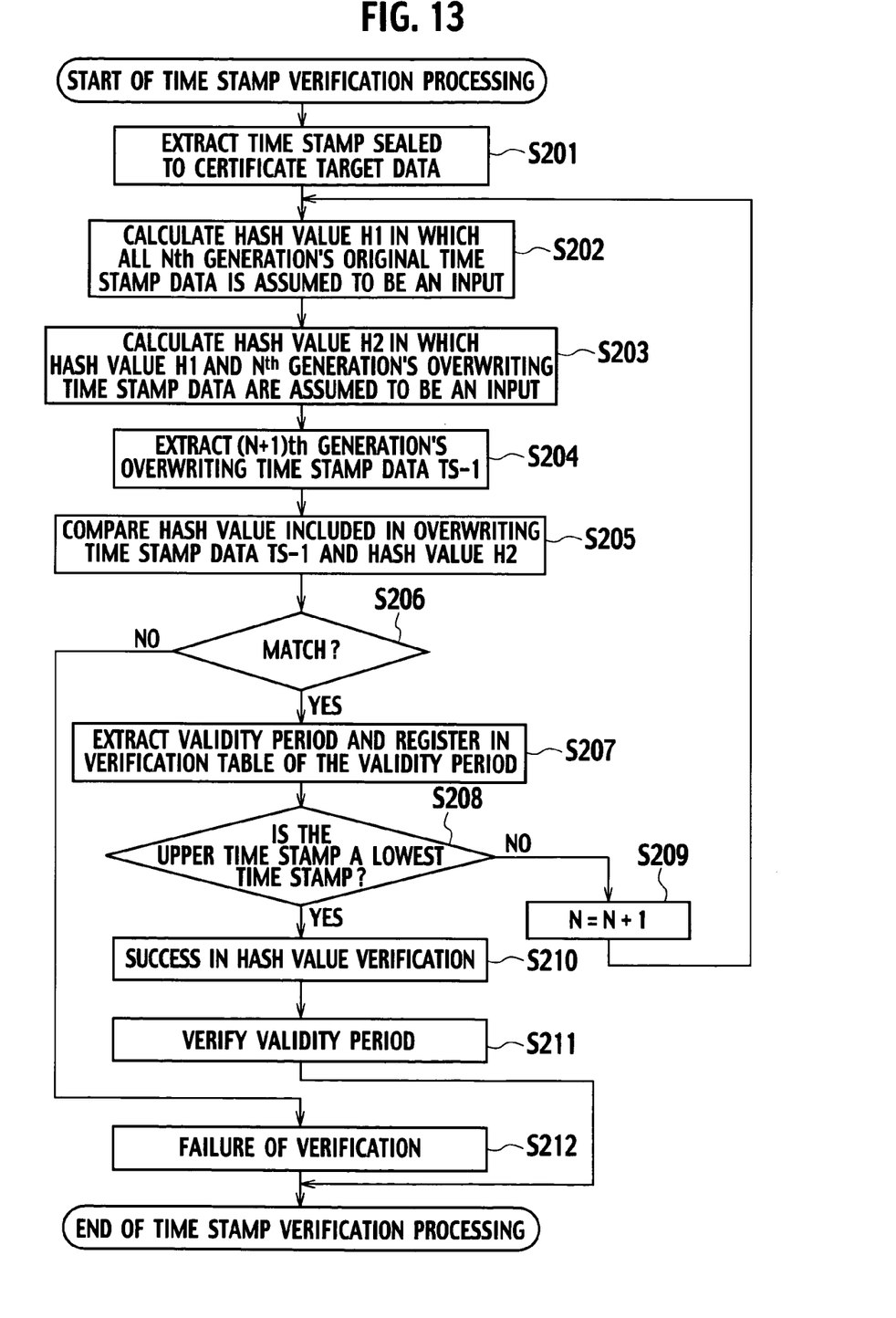
FIG. 13 is a flow chart for explaining a time stamp verification processing by a time stamp verification unit of the time stamp updating apparatus according to the second modification example of the embodiment of the present invention.

Next, a time stamp verification processing executed by the time stamp verification unit 12 according to the second modification example of the embodiment of the present invention will be explained referring to FIG. 13. Hereafter, the case where the certificating of $N^{th}$ generation of the certification target data is verified will be explained.

First of all, in Step S201, the original time stamp data sealed to the certification target data in $N^{th}$ generation, and the overwriting time stamp data and the original time stamp data more than $N^{th}$ generation are extracted from the management data storing unit 14.

Next, in Step S202, hash value H1 in which all $N^{th}$ generation's original time stamp data is assumed to be an input is calculated. Furthermore, in Step S203, the hash value H1 calculated in Step S202 and the overwriting time stamp data of $N^{th}$ generation is assumed to be a seal target data, and then hash value of the seal target data H2 is calculated. On the other hand, in Step S204, overwriting time stamp data TS-1 of the $N+1^{th}$ generation is extracted.

In Step S205, the hash value H2 calculated in Step S203 and hash value included in the overwriting time stamp data TS-1 extracted in Step S204 are compared. If determined not matching with in Step S206 as a result of the comparing, this processing goes to Step S212, outputs the message "Verification Failure", and is ended.

On the other hand, if determined matching with in Step S206 as a result of the comparing, in Step S207, the validity period of the overwriting time stamp data is extracted, and registered in the verification table data of validity period 14b. Furthermore, if the upper time stamp data TS-1 is not a time stamp data of the top in Step S208, in Step S209, processing of the time stamp of the $N^{th}$ generation (where N=N+1) is repeated from Step S202.

If the upper time stamp data TS-1 is a time stamp data of the top in Step S208, the hash value verification is assumed to be a success in Step S210, and the validity period registered in Step S207 is verified in Step S211. As explained by the embodiment of the present invention, as for the verification of the validity period, the logical sum (OR) of the validity period of the time stamp data provided based on the certification target data is calculated, the period that can go back from the time of the verification is calculated as a period when the certification target data can be certified, and this processing is ended.

OTHER EMBODIMENTS

Although the embodiment and the first and second modification examples of the present invention of the present invention have been explained, the present invention may be embodied in other specific forms without departing from the spirit or essential characteristics thereof. A variety of alternative embodiments, implementation examples, and the operation techniques are clear for those skilled in the art from this disclosure.

For example, the time stamp updating apparatus 1 described in the embodiment of the present invention may be composed on single hardware as shown in FIG. 1, and may be composed on two or more hardware according to the function and the number of processing. Moreover, the time stamp updating apparatus 1 may be achieved on an existing information system.

The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for update of a time stamp, the apparatus being able to certify certification target data on the basis of time stamp data transmitted from an apparatus for time stamp authority, the apparatus comprising:

an evidence data storage unit configured to relate the certification target data to the time stamp data and to save the related certification target data and time stamp data;

a time stamp obtaining unit configured to transmit hash value calculated from seal target data including the time stamp data that has already been related to the certification target data to the apparatus for time stamp authority according to a certain prescribed timing, to obtain time stamp data to the seal target data from the apparatus for time stamp authority, to relate the obtained time stamp data to the certification target data, and to store the related time stamp data and the certification target data in the evidence data storage unit;

a verification table data storage unit configured to store verification table data including respective validity periods of a set of time stamps corresponding to the time stamp data obtained by the time stamp obtaining unit; and a time stamp verification unit configured to output a period in which the validity periods in the verification table data are continuous from a time of verification as a period when the certification target data can be certified.

2. The apparatus of claim 1, wherein the seal target data is latest time stamp data among the time stamp data that have already been related to the certification target data.

3. The apparatus of claim 1, wherein the seal target data includes the time stamp data and the certification target data, wherein the time stamp data have already been provided for the certification target data.

4. The apparatus of claim 1, wherein the seal target data includes hash value calculated from original time stamp data provided for new certification target data of a predetermined generation and overwriting time stamp data provided for each of generation on the basis of the original time stamp data of a previous generation from the predetermined generation.

5. The apparatus of claim 3, wherein the time stamp verification unit extracts time stamp data generated on the basis of the certification target data, registers a validity period of original time stamp data in a validity period verification table when succeeding in the verification of the aforementioned original time stamp data provided for the certification target data, registers a validity period of the overwriting time stamp data in the validity period verification table when succeeding in the'verification of the aforementioned overwriting time stamp data of a next generation of a target generation to which the original time stamp data provided for the certification target data belongs, repeats processing that registers a validity period of the overwriting time stamp data of the next generation of the target generation in the validity period verification table when succeeding in the verification of the overwriting time stamp data of the next generation of incremented target generation until the next generation of the target generation becomes the latest generation while incrementing the target generation, and calculates logical OR of the validity period of the registered time stamp data registered in the validity period verification table, and outputs a period that can go back from the time of the verification as a period when the certification target data can be certified.

6. The apparatus of claim 1 further comprising a monitoring unit for key updating configured to detect a key in the apparatus for time stamp authority being updated, wherein the time stamp obtaining unit transmits hash value calculated from seal target data including time stamp data that has already been related to the certification target data to the apparatus for time stamp authority according to timing where the key is detected being updated by the monitoring unit for key updating, receives the time stamp data from the apparatus for time stamp authority, and stores the received time stamp data in the evidence data storage unit.

7. A non-transitory computer-readable recording medium storing instructions which, when executed by a processor, perform a method for updating, a time stamp, to certify certification target data on the basis of time stamp data transmitted from an apparatus for time stamp authority, the method comprising:

in an evidence data storage unit, relating the certification target data to the time stamp data and saving the related certification target data and time stamp data;

in a time stamp obtaining unit, transmitting hash value calculated from seal target data including the time stamp data that has already been related to the certification target data to the apparatus for time stamp authority according to a certain prescribed timing, obtaining time stamp data to the seal target data from the apparatus for time stamp authority, relating the obtained time stamp data to the certification target data, and storing the related time stamp data and the certification target data in the evidence data storage unit;

in a verification table data storage unit, storing verification table data including respective validity periods of a set of time stamps corresponding to the time stamp data obtained by the time stamp obtaining unit; and in a time stamp verification unit, outputting a period in which the validity periods in the verification table data are continuous from a time of verification as a period when the certification target data can be certified.

8. The non-transitory computer-readable recording medium, of claim 7, wherein the seal target data is latest time stamp data among the time stamp data that have already been related to the certification target data.

9. The non-transitory computer-readable recording medium, of claim 7, wherein the seal target data includes the time stamp data that have already been provided for the certification target data and the certification target data.

10. The non-transitory computer-readable recording medium, of claim 7, wherein the seal target data includes hash value calculated from original time stamp data provided for new certification target data of a predetermined generation and overwriting time stamp data provided for each generation on the basis of the original time stamp data of a previous generation from the predetermined generation.

11. The non-transitory computer-readable recording medium, of claim 9, wherein in the time stamp verification unit, time stamp data generated on the basis of the certification target data is extracted, a validity period of original time stamp data is registered in a validity period verification table when succeeding in the verification of the aforementioned original time stamp data provided for the certification target data, a validity period of the overwriting time stamp data is registered in the validity period verification table when succeeding in the verification of the aforementioned overwriting time stamp data of a next generation of a target generation to which the original time stamp data provided for the certification target data belongs, processing that registers a validity period of the overwriting time stamp data of the next generation of the target generation in the validity period verification table is repeated when succeeding in the verification of the overwriting time stamp data of the next generation of incremented target generation until the next generation of the target generation becomes the latest generation while incrementing the target generation, and logical OR of the validity period of the registered time stamp data registered in the validity period verification table is calculated, and a period that can go back from the time of the verification is output as a period when the certification target data can be certified.

12. The non-transitory computer-readable recording medium of claim 7, wherein the method further comprises, in a monitoring unit for key updating, detecting a key in the apparatus for time stamp authority being updated, and the computer executable program wherein in the time stamp obtaining unit, hash value calculated from seal target data including time stamp data that has already been related to the certification target data is transmitted to the apparatus for time stamp authority according to timing where the key is detected being updated by the monitoring unit for key updating, the time stamp data is received from the apparatus for time stamp authority, and the received time stamp data is stored in the evidence data storage unit.

* * * * *